United States Patent [19]

Smith

[11] 4,247,182
[45] Jan. 27, 1981

[54] HELIOSTAT WITH A PROTECTIVE ENCLOSURE

[76] Inventor: Otto J. M. Smith, 612 Euclid Ave., Berkeley, Calif. 94708

[21] Appl. No.: 32,871

[22] Filed: Apr. 24, 1979

Related U.S. Application Data

[63] Continuation-in-part of Ser. No. 916,136, Jun. 16, 1978, abandoned.

[51] Int. Cl.³ .......................... E24J 3/02; G03B 21/00
[52] U.S. Cl. ........................................ 353/3; 126/418; 350/306
[58] Field of Search .................... 353/3; 350/288, 289, 350/299, 306; 126/418, 438, DIG. 1

[56] References Cited

U.S. PATENT DOCUMENTS 4,026,269  5/1977  Stelzer .............................. 126/418

FOREIGN PATENT DOCUMENTS

2558767  7/1977  Fed. Rep. of Germany .......... 126/418
113636  4/1942  Sweden .................................. 350/306

*Primary Examiner*—Harry N. Haroian
*Attorney, Agent, or Firm*—Flehr, Hohbach, Test, Albritton & Herbert

[57] ABSTRACT

A heliostatic mirror is rotatably mounted in an enclosure which gives the mirror full protection when rotated to a stowed position but yet provides flexibility in aiming the mirror at the sun.

24 Claims, 10 Drawing Figures

HELIOSTAT WITH A PROTECTIVE ENCLOSURE

This is a continuation in part of application Ser. No. 916,136 filed June 16, 1978, now abandoned.

BACKGROUND OF THE INVENTION

The present invention is directed to a heliostat with a protective enclosure.

Thus far no one has provided a method of protecting the surfaces of the mirrors in heliostats for solar power plants; not even using window shades or any shutter mechanisms to protect them. Flexible cloth was attempted at Albuquerque, New Mexico and within a short interval of time the wind blowing on the cloth combined with the very very fine dust which was on the underside of the cloth to completely ruin the mirrors by sandblasting them with the action of the wind on the cloth.

OBJECTS AND SUMMARY OF THE INVENTION

It is, therefore, a general object of this invention to provide an improved heliostat with a protective enclosure.

In accordance with the above object there is provided a heliostat with a protective, rigid enclosure. Mirror means are mounted for rotation in the enclosure from a first position where the mirror means is completely protected from the environment to a second position where it is pointed toward the sun.

DETAILED DESCRIPTION OF THE PREFERRED EMBODIMENT

Figure 1:
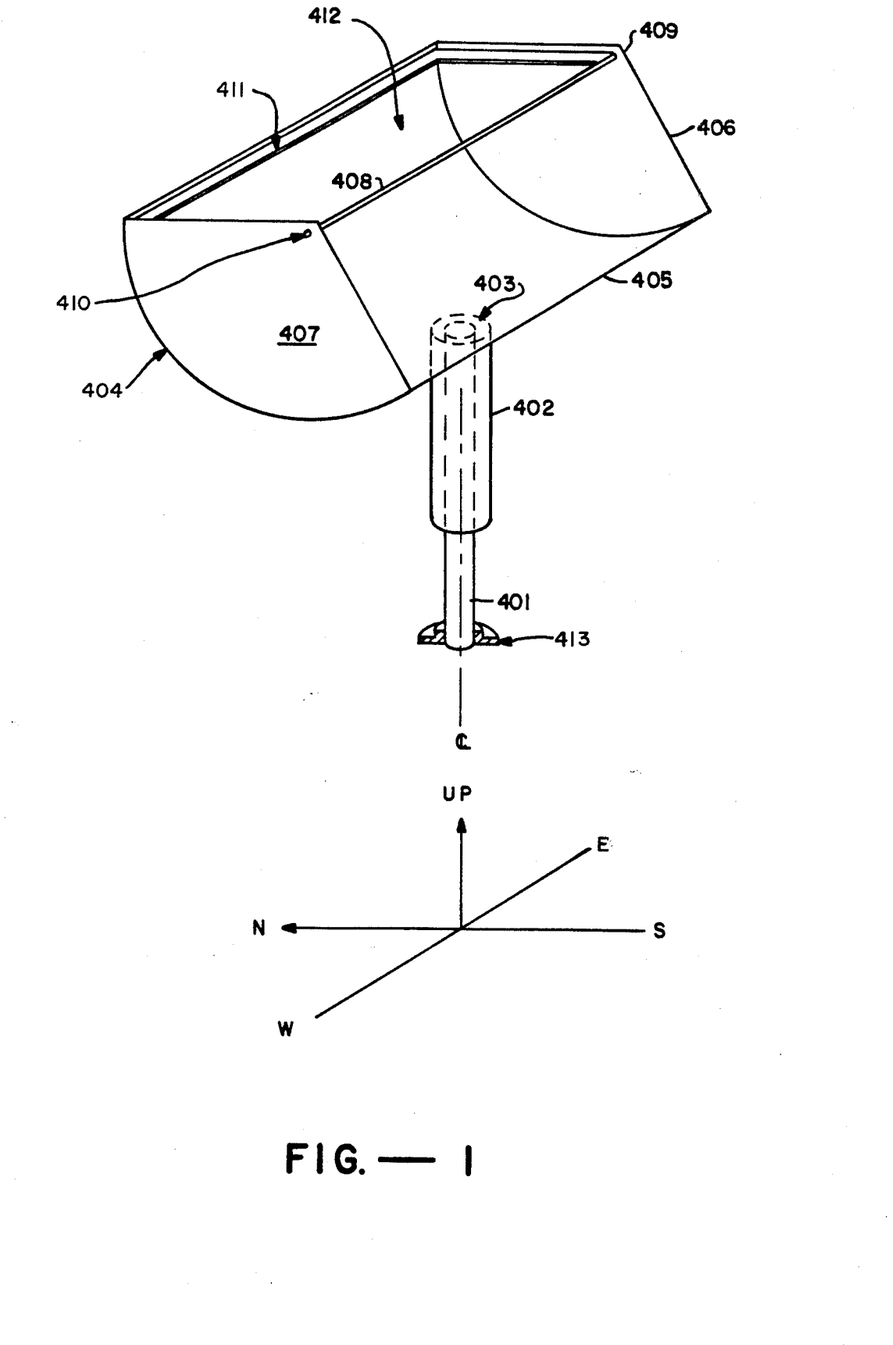
FIG. 1 is a perspective view of a portion of the heliostat with protective enclosure of the present invention.

In FIG. 1 is shown the main structural support for a mirror to be used in a solar electric power plant. This entire assembly will be called a heliostat. FIG. 1 just shows the outside shell or box 404 of the heliostat. The support pedestal 401 is surrounded by a sand shield 402 which will protect the mechanism for rotating this device. The sand shield 402 and the pedestal 401 both terminate in a flange 403 which is mounted in the bottom of the box or main support 404. This main support consists of a cylindrical surface 405 into which the flange 403 is rigidly mounted and two pie-shaped end plates 406 and 407 which end plates carry a shaft 408 with terminations that pass through the end plate 406 at a location 409 and pass through end plate 407 at termination 410. The inside of the cylindrical surface 405 is smooth except for a small thin flange 411 which is mounted in the horizontal plane terminating at or very close to shaft 408 and providing approximately ½ inch of thin width extending into the interior portion of the cylindrical box. The purpose of this flange 411 is to provide sealing to the edge of the mirror when it is in the stowed position. And it has no other purpose except for closing the box in this particular mode of operation. In FIG. 1 it is shown that the open face of the box is in the south and upward portion of the box. The cylindrical surface is at the bottom part of the box, the shaft normally passes east and west but because the support pedestal can rotate the shaft can be rotated in azimuth and the second open surface of the box is the horizontal surface 412 which is aimed towards the sky and has the shaft 408 for one edge and the flange 411 for the other three edges. This surface is on the northerly side of the main support box or shell.

Figure 2:
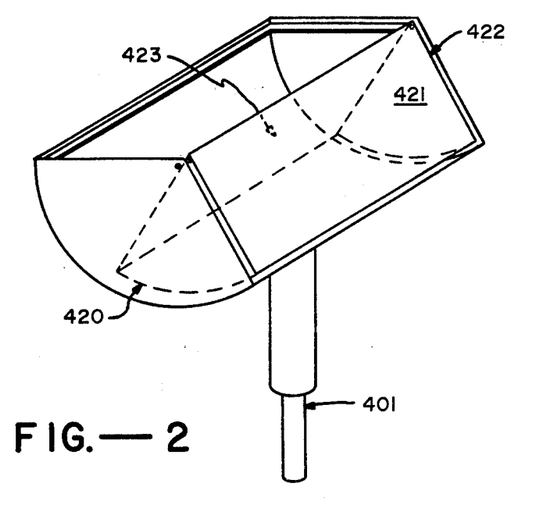
FIG. 2 is a perspective view similar to FIG. 1 with an added part.

FIG. 2 shows the same support box but now there has been added an internal swinging box which has rigid closed pie-shaped end pieces 420 and 421 and it has a closed panel on the south and upward side 422 and an open back panel 423 so that the box now with this swinging internal section appears to be closed on the south side but it is still open on the northern upper side which has the flange 411 as its boundary. This swinging box is hinged about the shaft 408 and can move approximately 60°.

Figure 3:
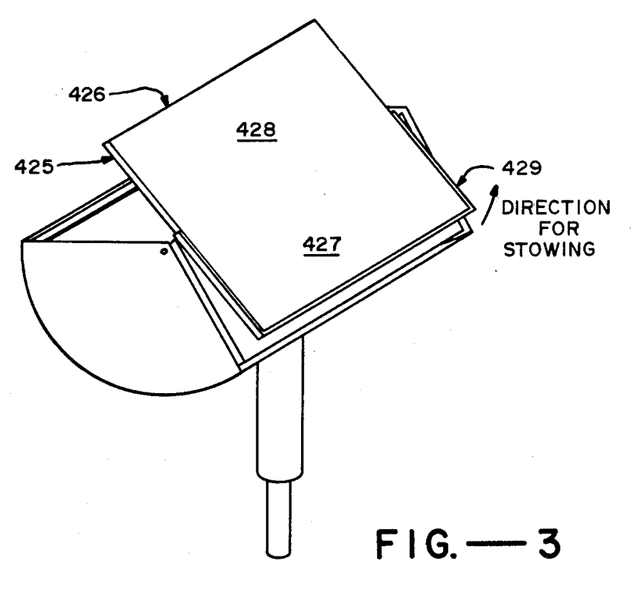
FIG. 3 is a perspective view of a portion of FIG. 2 with a mirror.
Figure 4:
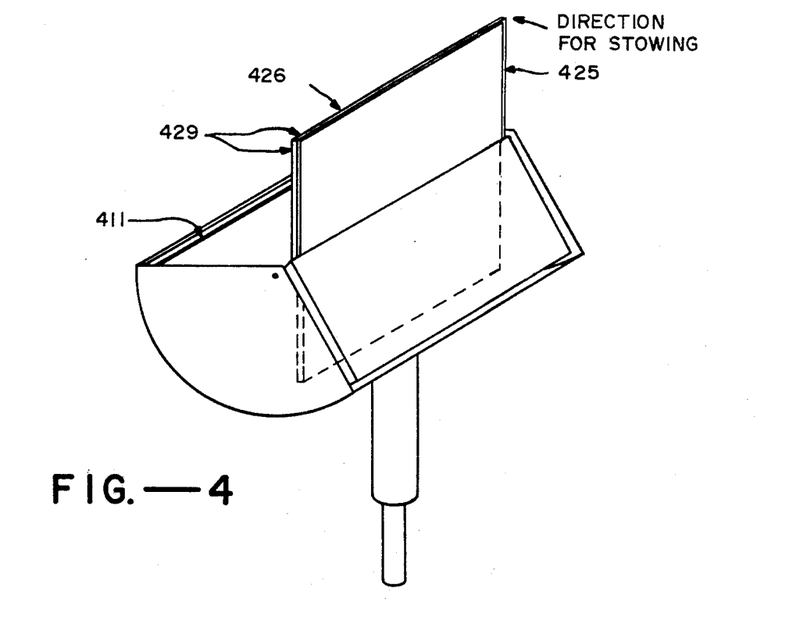
FIG. 4 is a perspective view similar to FIG. 3 but with the mirror in a different position.
Figure 5:
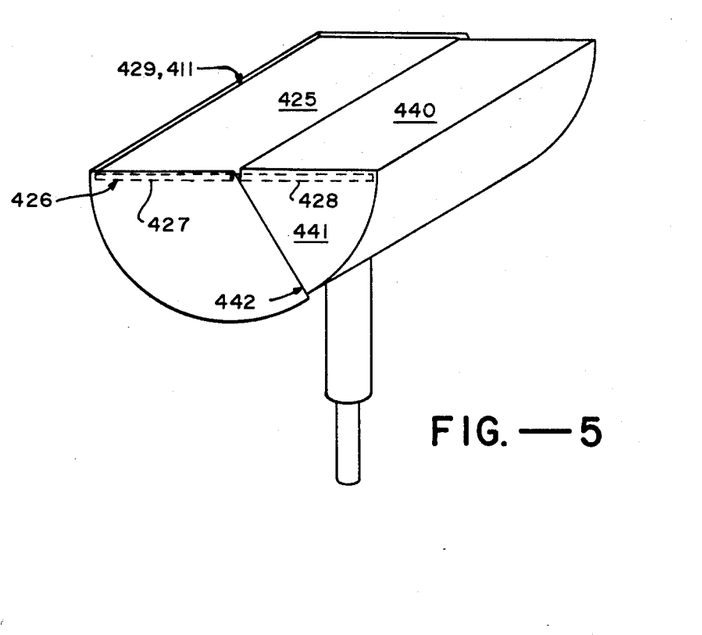
FIG. 5 is a perspective view similar to FIG. 3 showing the mirror in a fully stowed position.

In FIG. 3 the operating mirror has now been shown mounted on the shaft 408 by means of bearings and support mechanisms on the structural surface which is in close proximity to the shaft 408. The structural surface of the mirror is on the underside of the mirror as shown in FIG. 3. The upper side of the mirror has a reflecting surface which can be silvered glass or aluminum sheets or aluminized or chromed or silvered polyester. In FIG. 3 425 is the structural surface that supports the mirror and 426 is the reflecting surface which is on the top side of the mirror. The mirror can be thought of as having two halves. A bottom half which is designated as 427 and a top half designated as 428. The top half 428 has a plain edge around the east, west and north edges but the bottom half 427 has a small weather strip edge of larger dimensions than the edges of the top half around the bottom, east and west edges of 427. The direction for stowing the mirror is shown in FIG. 3 by the arrow 429. This arrow shows that when it is desired to stow the mirror that the bottom edge will be lifted up and to the south and the top edge will be turned towards the north and down. As the mirror panel rotates in this manner the top surface 428 will first become horizontal and then will pass into the structural support shell while the surface 427 will become horizontal and then will pass up and then will eventually have the mirror towards the north and the structural backing will be towards the south. Rotating approximately 135° from the angle shown in FIG. 3 will produce the angle shown in FIG. 4. In FIG. 4 it can be seen that the mirror is now vertical, the structural surface is on the north side of the shaft 408 and is pointed towards the south, the mirrored reflecting surface is pointed towards the north, the plane edges of panel 428 are all inside of the external shell 404 and the weather stripped edges are on the top east and west exposed portions of the mirror. Continuing to rotate from FIG. 4 another 90° in the direction shown for stowing produces the mirror stowed in the position shown in FIG. 5. As the plain edges inside the swinging box rotate approximately 30° from the angle shown in FIG. 4, the structural surface of the mirror will come into contact with the closed panel on the swinging box as shown in FIG. 2. It will hit this closed panel from the inside and after it has hit the closed panel it will begin to lift it and will lift that closed panel or solid face of the swinging box up until it is in the position shown as 440 in FIG. 5. The surface in contact with this is the surface 428. When the mirror is in this fully stowed position as shown in FIG. 5, the weather-stripped edge will now be above the flange of FIG. 1 and this weather stripped edge will therefore seal the box on the east, west and north sides against the flange. In this position shown in FIG. 5 it can be seen that the box can be arranged to be completely closed and completely sealed at every joint by using conventional weather stripping techniques at the joint between the rotating swinging box panel 441 and the fixed edge 442 and also at the corresponding other edges of the rotating swinging box where it must be sealed to the external shell.

This structure now provides a method of controlling a heliostatic mirror for a solar thermal electric power plant with the following properties. The mirror can be adjusted in elevation with the mirror surface having approximately a 30° deviation from the vertical to a full 90° deviation from the vertical. With the support pedestal the entire structure can be rotated a full 360° and with the mirror rotated into the fully stowed position the mirror surface can be completely protected from inclement weather or from environmental hazards. In order to control the motion of the heliostat with respect to the ground there would normally be provided but it is not illustrated in the drawings a motor and a worm gear mounted between the bearing 413 shown in FIG. 1 and the shaft 401. The sand shield 402 would extend over this motor and protect it from the environment. In order to control the mirror surface in elevation there would be mounted a stepping motor on the surface 407 with a worm gear that would drive the mirror shown in FIG. 3 and this motor would preferably be located near the top west edge of surface 407 and would be so positioned that when the mirror is stowed as in FIG. 5 the motor and the worm gear driving the mirror would all be inside the box and protected from the environment.

Figure 6:
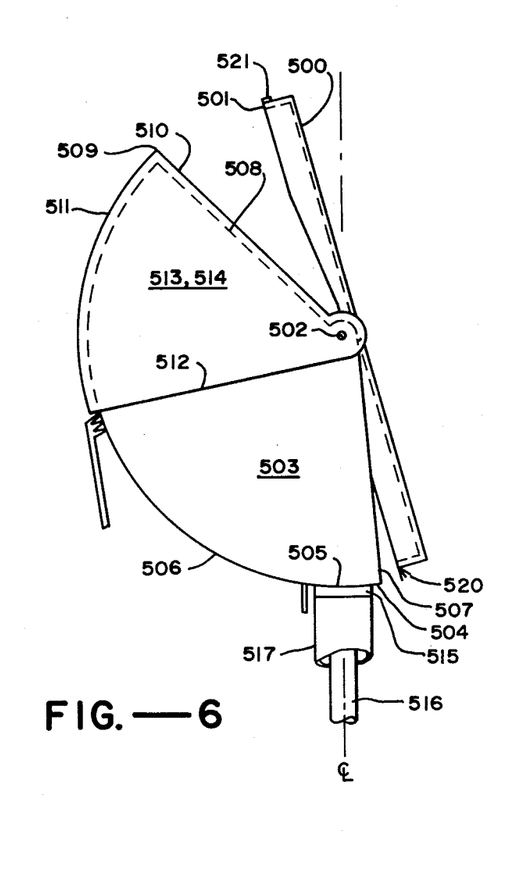
FIG. 6 shows another embodiment of a protective enclosure for a heliostat mirror.

FIG. 6 shows another embodiment of a protective enclosure for a heliostat mirror. The fiberglass-epoxy platen 501 has a reflecting surface 500 turned toward the sun. The platen is mounted on a horizontal shaft 502 which permits rotation to change the elevation angle of the mirror. The shaft 502 is supported by a flat end piece 503 of a cylindrical enclosure 504 which has a closed surface bottom 505 and closed back 506, an open front side 507, and an open top 508. Over the open top is a hinged lid 509 with a closed top 510, a closed cylindrical back 511, an open bottom 512, and closed sides 513 and 514. The shaft 502 passes through the side 513, so that the lid can rotate about the shaft. The bottom 505 of the cylindrical enclosure 504 is supported by a flange 515 at the top of a support post 516, which is enclosed by a sand shield 517.

The platen 501 has a soft brush 520 mounted on the bottom edge and it has a weather strip 521 along the top edge. The radius from 502 to the platen bottom edge is less than from 502 to the platen top edge.

Figure 7:
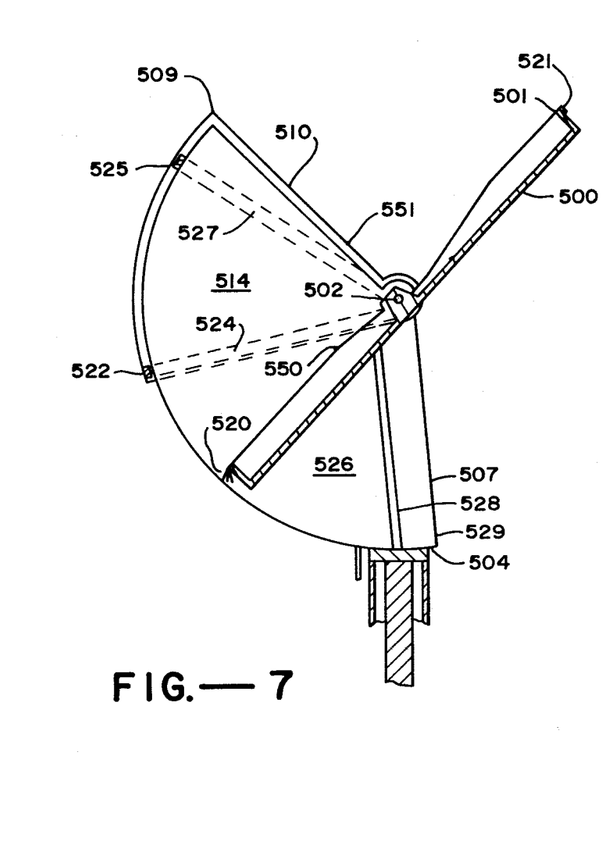
FIG. 7 shows a cross-section view through the axis of the support post and perpendicular to the horizontal shaft.

FIG. 7 shows a cross-section view through the axis of the support post and perpendicular to the horizontal shaft. It is similar to FIG. 6 with the mirror rotated to the right (top toward the sun and bottom away from the sun) so that the mirror reflecting surface 500 is on the lower side of the platen. The brush 520 is touching the inside of the cylindrical surface 506.

Inside of the lid 509 is a weatherstrip 522 parallel to shaft 502 and two radial weather strips 523 (not visible) and 524 fastened to the flat sides 513 and 514 respectively.

Fastened to the outside of surface 506 of cylinder 504 is a weatherstrip 525 parallel to the shaft. The end panel 526 of enclosure 504 has a radial weather strip 527 fastened to the outside, and a radial weather strip 528 fastened to the inside.

As shown in FIG. 7, when the mirror is rotating into the enclosure (to the right), the brush 520 touches the inside of 506 and brushed loose dust and dirt. When the mirror is rotating to the left, the end of the platen 501 is coming down and to the right, and the brush 520 is sweeping down and to the right, and will sweep the dust and dirt toward the open side 507 and out over the edge 529 of the bottom on the open side 507.

Figure 8:
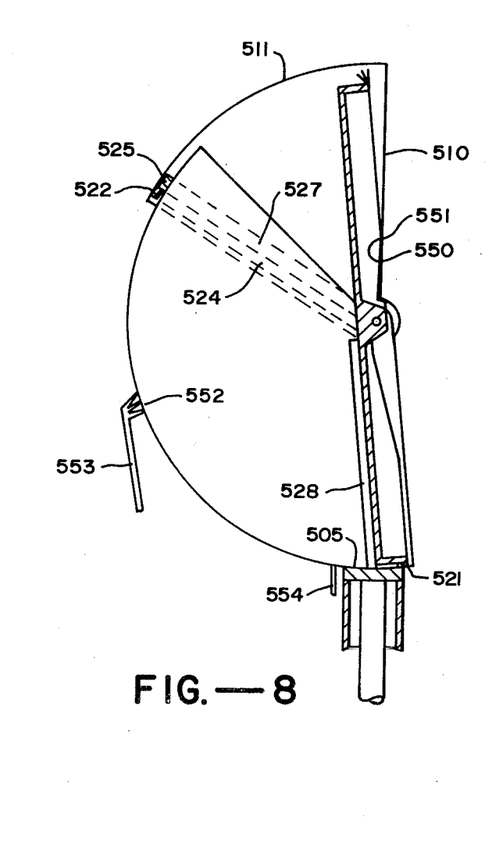
FIG. 8 is a cross-sectional view similar to FIG. 7.

FIG. 8 is a cross-sectional view similar to FIG. 7, except that the mirror platen has been rotated farther to the right until a fiberglass point 550 has come into contact with a corresponding point 551 on the underside of the lid top 510, and the platen was further rotated to the right, lifting up the lid and carrying it in contact with the platen until surface 510 was substantially vertical.

In FIG. 8, weather strip 522 is in contact with weather strip 525. Weather strip 524 is in contact with weather strip 527. Weather strip 521 is in contact with bottom surface 505. Weather strip 528 is in contact with the radial edge of the mirror platen. The dimensions are so chosen that the movable mirror and movable lid form a weather-tight seal to each other and to the enclosure 504 so that the mirror surface is completely protected from the external environment such as rain and sandstorms.

In addition to being protected from the environment in FIG. 8, the mirror surface is also in a position for maintenance. Nozzles 552 are provided connected to a piping system 553 so that compressed air can be blown on to the mirror surface to blow off dust. The same nozzles 552 can be used to spray water or a detergent liquid on to the mirror surface to wash the surface. The drain liquid is collected by pipe 552 and recycled. Compressed air can also be used to dry the mirror surface by being blown through nozzles 552.

Figure 9:
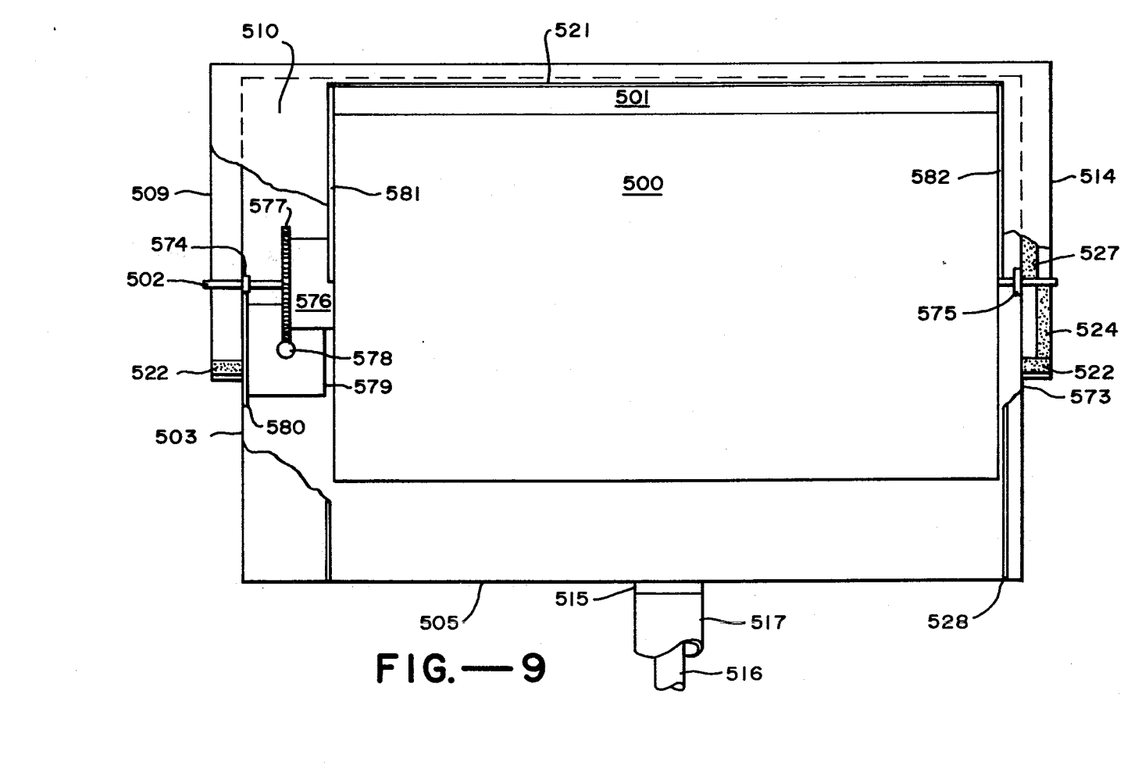
FIG. 9 is a elevational view from the front of the platen enclosure with the mirror at an angle similar to FIG. 7.

FIG. 9 is an elevation view from the front of the platen enclosure with the mirror at an angle similar to FIG. 7, and with portions of the lid 510 and enclosure 504 cut away to show the stepping motor.

Support post 516 supports flange 515 and the enclosure bottom 505. The left side 503 and the right side 573 each support bearings 574 and 575 respectively for the shaft 502. The platen 501 is connected to a hub 576 and helical gear 557 which is driven by a worm gear 578 on a reversible stepping motor 579, whose base 580 is mounted on side 503.

Inside of the lid 509 can be seen the end of the weather strip 522. On the right side is the radial weather strip 524 attached to side 514. At the top of platen 501 is the weather strip 521. On each side are additional weather strips 581 and 582. These cause the upper half of the mirror to have a greater width than the lower half of the mirror. The lower half can rotate freely into the protective enclosure but the upper half is stopped by the side weather strip 528 when it comes into contact with the side weather strip 582.

Not shown in FIG. 9 is the detail of the enclosure surrounding the stepping motor and gear. The gears 577 and 578 are protected at all times from the environment by a protective box which includes the assembly of the stepping motor and gears. This box is inside of the enclosure 504, so that the gears are double protected at night when the openings of the enclosure 504 are all sealed by the weather-stripping system.

It can be seen that FIG. 6 provides a protective enclosure with a hinged lid and an open lower front side through which a mirror rotating on a horizontal shaft can rotate 160 degrees from the position of touching the lid on the outside and holding said lid down, to the position of touching the lid on the inside and starting to lift it up.

It can be seen that FIG. 8 provides a protective enclosure for which one opening has a lid which is liftable by a first portion of a rotating mirror to a position which seals the exterior edges of said lid, and said enclosure has a second opening which is closable and sealable by the exterior edges of a second portion of said mirror.

It can be seen that FIG. 9 provides a protective enclosure for a rotatable mirror with a horizontal axis such that the motor and gears to provide said rotation are within said protective enclosure and one aperture of said enclosure is opened by the mirror in its normal operating position of reflecting sunlight, and said aperture is closed by the mirror with the reflecting surface in the interior of the enclosure, and the back of the mirror surface exposed to the exterior environment.

This invention provides a protective enclosure for a rotatable mirror having a cylindrical interior surface, said mirror having a maximum-radius edge with a brush parallel to the axis of rotation, said brush providing a sweeping and cleaning action on the said cylindrical surface, when said mirror is rotating.

This invention provides a protective enclosure for a rotatable mirror, with apertures which are closed by the mirror platen and extremal edges, the reflective surface being on the interior of the said enclosure when the said apertures are closed, and means for cleaning the said reflective surface comprising jets mounted in the walls of the said enclosure, and a fluid passing through said jets.

FIGS. 8 and 9 therefore disclose a protective enclosure for a heliostat mirror comprising an impervious surface 505, 506 providing a semi-closed section 504 with an axis, a shaft 502 parallel to said axis, closed ends 503 and 573 perpendicular to said axis, said section being a closed surface for less than 180 degrees with respect to said axis, a first aperture 508 bounded by said shaft, by one straight edge of said surface parallel to said shaft, and by radial edges of said ends, a second aperture 507 bounded by said shaft, and by another straight edge 529 of said surface parallel to said shaft, and by other radial edges of said ends, a hinged lid 509 rotatable about said shaft through an angle of at least 30 degrees, said lid effectively enclosing said first aperture at both extreme positions of said angle, a mirror platen 501 rotatable about said shaft said platen having a reflecting surface 500 on one side, the other side being designated the platen back, means 576–580 for rotating said platen to a first position (FIG. 6) so that said reflecting surface is outside of said aperture and capable of reflecting light from the direction opposite the said section, and said second aperture faces said platen back, and said lid is in a minimum volume state when said platen is in said first position, and said means also serving to rotate said platen to a second position (FIG. 8) whereby said second aperture is closed by said platen back on the outside, and said reflecting surface is enclosed by said section and said lid, said lid being in an expanded-volume state.

FIG. 8 also discloses that the protective lid is rotated through at least 30 degrees by the force exerted by said platen on said lid when said platen is moved by the stepping motor from the position in FIG. 7 to the position in FIG. 8.

FIG. 8 discloses that a maximum radius edge of said platen back has mounted thereon a weather-strip 521 which is in contact with the interior surface of said section 505 when said platen is in said second position.

FIG. 7 discloses a brush 520 attached to another edge of said platen parallel to said shaft, wherein when said means 576–580 is rotating said platen from said second position (FIG. 8) toward said first position (FIG. 6), said brush comes into contact with the interior surface of said section 506 for a portion of this rotation and serves to sweep said interior surface.

Figure 10:
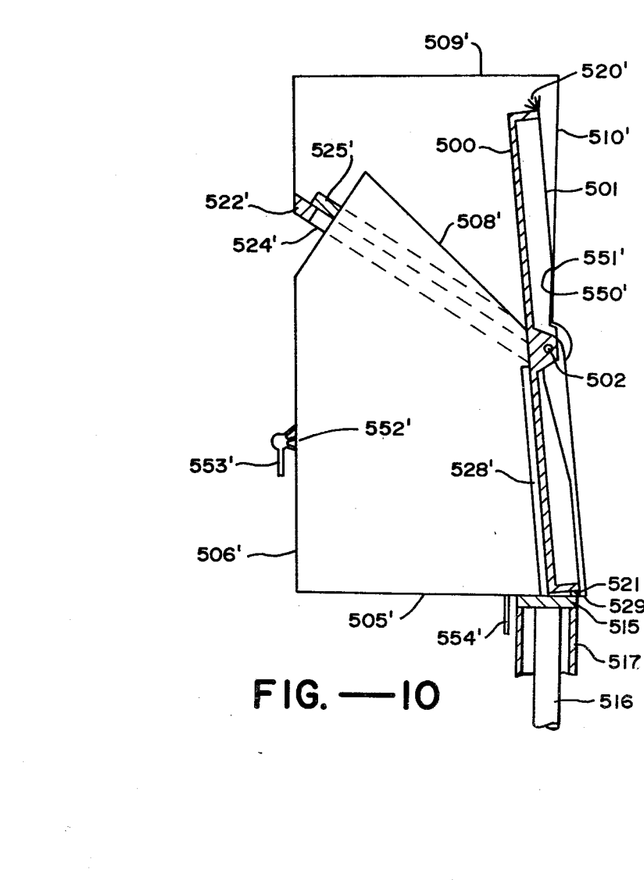
FIG. 10 shows a protective enclosure providing the same function with a rectangular box-like enclosure.

In FIGS. 6, 7, and 8, the said section has been shown to be cylindrical in shape, but this invention is not restricted to a cylindrical enclosure. FIG. 10 shows a protective enclosure providing the same function with a rectangular box-like enclosure.

Thus the present invention is a form a heliostat to be put out in the field that saves a significant amount of steel by using a box for the structural members instead of beams and rods. This box is made more like the fenders of an automobile and depends on geometry for its rigidity and strength instead of depending upon a large amount of heavy steel or aluminum. Furthermore, by using a box it is possible to stow the mirror inside of the box and protect it from sand storms and from dew at night. Therefore a dual function has been provided; one, a low cost rigid and low weight support for a controllable mirror and secondly, a protective enclosure into which the mirror can be rotated to completely protect it from the environment such as sand, etc. Moreover, the structure is very close to the ground thus allowing a short inexpensive pedestal.

The heliostat of the present invention is ideal for use in the solar power systems disclosed in U.S. Pat. No. 4,117,682 issued Oct. 3, 1978, and Ser. No. 717,641, allowed Mar. 22, 1979 (Filed Aug. 25, 1976) now U.S. Pat. No. 4,164,123, issued Aug. 14, 1979 in the name of the present inventor which are incorporated herein by reference.

What is claimed is:

1. A heliostat with a protective enclosure comprising: a rigid enclosure; mirror means substantially rectangular in configuration and with one side mirrored and mounted at a midline for rotation in said enclosure from a first position where such mirrored side is completely protected from the environment to a second position where it is pointed toward the sun, wherein said mirrored side in said second position has an elevation angle which reflects incident solar illumination toward a power receptor, and wherein the rotation of said mirror toward said first position requires a change in said elevation angle of more than ninety degrees.

2. A heliostat with a protective enclosure comprising: a rigid enclosure including a cylindrical surface with pie-shaped end plates forming a rigid structure; mirror means mounted for rotation in said enclosure from a first position where such mirror means is completely protected from the environment to a second position where it is pointed toward the sun, wherein said mirror in said second position has an elevation angle whch reflects incident solar illumination toward a power receptor, and wherein the rotation of said mirror toward said first position requires a change in said elevation angle of more than ninety degrees.

3. A heliostat as in claim 2 where said end plates carry a shaft on which said mirror means is mounted for rotation.

4. A heliostat as in claim 3 together with a second similar structure internal to said other structure and swingable on said shaft by movement of said mirror means.

5. A protective enclosure for a heliostatic mirror controllable in elevation angle, comprising a horizontal shaft supported at each end by solid surface sides, said sides each having a first edge from near the shaft approximately radially to a first maximum radius, said sides each having a second edge from near the shaft approximately radially to a second maximum radius, said second edge more than ninety degrees from said first edge, one of said first edges joining one of said second edges near one end of said horizontal shaft, and the other of said first edges joining the other of said second edges near the other end of said horizontal shaft, each of said solid surface sides having a remaining third edge which is neither the said first edge nor the said second edge, a solid bottom surface joining one of said third edges to the other of said third edges, said mirror rotatably mounted on said shaft, the width of a first portion of said mirror being less than the internal distance between said solid surface sides, such that said first portion of said mirror can rotatably move between said solid surface sides, said mirror rotatable through an angle greater than 180 degrees.

6. An enclosure as in claim 5 where in said solid bottom surface is substantially cylindrical, with a first axial edge parallel to said shaft and joining one of said first edges to the other of said first edges, said solid bottom surface having a second axial edge parallel to said shaft and joining one of said second edges to the other of said second edges, one of said axial edges comprising a sealable axial edge at a constant fixed radius from said shaft, the said first portion of said mirror having a first mirror edge at constant first radius from said shaft, the mirror surface not included in said first portion being designated the second portion, said second portion having a second mirror edge at constant second radius from said shaft and aparallel to said first mirror edge, the said first radius of rotation of said first mirror edge being less than said constant fixed radius, the said second radius of rotation of said second mirror edge being greater than said constant fixed radius, such that when said second mirror edge is in contact with said sealable axial edge, the passage of air and matter between said second mirror edge and said sealable axial edge is substantially prevented.

7. An enclosure as in claim 6, wherein said first edges comprise sealable first edges, and wherein said second portion of said mirror has two radial mirror edges, the width between said two radial mirror edges being greater than the internal distance between said first sealable edges, such that when said radial mirror edges are in contact with said first sealable edges, the passage of air and matter between one of said radial mirror edges and one of said first sealable edges is substantially stopped.

8. An enclosure as in claim 5 wherein said first edges comprise sealable first edges, and wherein a second portion of said mirror has two radial mirror edges, the width between said two radial mirror edges being greater than the internal distance between said first sealable edges, such that when said radial mirror edges are in contact with said first sealable edges, the passage of air and matter between one of said radial mirror edges and one of said first sealable edges is substantially stopped.

9. An enclosure as in claim 7, containing means for rotating said mirror about the axis of said shaft, said means being positioned between said solid surface sides.

10. An enclosure as in claim 7, wherein said mirror normally operates with the plane of the mirror essentially vertical after sunrise, with the angle of elevation of the normal to said mirror increasing towards 45 degrees for successive morning hours, wherein said mirror can be protectively stowed by rotating the plane of the mirror more than 135 degrees from a normal operating angle, until said second mirror edge is in contact with said sealable axial edge and said radial mirror edges are in contact with said first sealable edges.

11. A heliostat consisting of a tiltable mirror mounted rotatably on a horizontal shaft, end supports for said shaft consisting of two solid sides, said sides being rigidly positioned by the solid bottom of a box, said bottom being joined to each of the said two sides, said sides and said bottom forming an equator-facing first aperture whose top is the said shaft, said solid bottom being shaped to provide a rising wall opposite said first aperture, said wall terminating in an upper wall edge parallel to said shaft, each of said sides having an upper side edge, said upper side edges and said upper wall edge and said shaft forming a second aperture which is approximately a planar rectangle, wherein when said mirror is facing the sun, the upper portion of the mirror is defined as that which is above the shaft, and the lower portion of the mirror is defined as that which is below the shaft, one of said portions being small enought to rotate through one of said apertures, and for an additional elevation angle change of approximately 180 degrees, the other of said portions being too large to rotate through said one of said apertures.

12. A heliostat as in claim 11 wherein said shaft supports a rotatable door, said door hinged on said shaft, said one of said portions being smaller than said door, and wherein elevation angle changes of said mirror will move said one of said portions through said one of said apertures causing said one of said portions to contact said door and to move said door in contact with said one of said portions until the motion is limited by said other of said portions contacting the edges of said one of said apertures.

13. A protective enclosure for a heliostat mirror comprising an impervious surface providing a semi-closed section with an axis, a shaft parallel to said axis, closed ends perpendicular to said axis, said section being a closed surface for less than 180 degrees with respect to said axis, a first aperture bounded by said shaft, by one straight edge of said surface parallel to said shaft, and by radial edges of said ends, a second aperture bounded by said shaft, and by another straight edge of said surface parallel to said shaft, and by other radial edges of said ends, a hinged lid rotatable about said shaft through an angle of at least 30 degrees, said lid effectively enclosing said first aperture at both extreme positions of said angle, a mirror platen rotatable about said shaft, said platen having a reflecting surface on one side, the other side being designated the platen back, means for rotating said platen to a first position so that said reflecting surface is outside of said apertures and capable of reflecting light from the direction opposite the said section, and said second aperture faces said platen back, and said lid is in a minimum-volume state when said platen is in said first position, said means also serving to rotate said platen to a second position whereby said second aperture is closed by said platen back on the outside, and said reflecting surface is enclosed by said section and said lid, said lid being in an expanded-volume state.

14. A protective enclosure as in claim 13 wherein said means can rotate said platen to a third position whereby said reflecting surface reflects the incident light at a maximum angle of elevation, with a point of said platen back in contact with the outside of said lid, and wherein in a fourth position of said platen, another point of said platen back is in contact with the inside of said lid in said minimum-volume state, and wherein said means can rotate said platen successively from said third position through said first position through said fourth position to said second position.

15. A protective enclosure as in claim 14, wherein said lid is rotated through at least 30 degrees by the force exerted by said platen on said lid when said platen is moved by said means from said fourth position to said second position.

16. A protective enclosure as in claim 13 wherein a maximum-radius edge of said platen back has mounted thereon a weather-strip which is in contact with the interior surface of said section when said platen is in said second position.

17. A protective enclosure as in claim 16 wherein a brush is attached to another edge of said platen parallel to said shaft, and wherein when said means is rotating said platen from said second position toward said first position, said brush comes into contact with the interior surface of said section for a portion of this rotation and serves to sweep said interior surface.

18. A protective enclosure as in claim 13, wherein said means is enclosed by said section and said lid and said platen back when said platen is in said second position.

19. A protective enclosure as in claim 13, wherein said enclosure contains nozzles aimed at said reflecting surface when said platen is in said second position, and means for providing a fluid to said nozzles, said fluid serving to clean said reflecting surface.

20. A protective enclosure as in claim 13, wherein said section comprises a cylindrical shape with the axis of the cylinder parallel to said shaft.

21. A rigid protective enclosure adjacent to a rotatable platen means for carrying an area to be illuminated by solar radiations, means for rotation of said platen about a horizontal axis relative to said enclosure from a first postion to a second position, wherein in said first position said area is illuminated by solar radiation and said platen is on the equatorial side of said enclosure, and wherein in said second position said area is protected within said enclosure, said enclosure having an aperture with external and internal sides, wherein in said first position, said area is on the external side of said aperture and wherein the rotation of said area toward said second position causes approximately half of said area to pass through said aperture from the external to the internal side, and wherein the rotation of said platen from said first position to said second position requires a change in angle of more than ninety degrees.

22. A rigid protective enclosure adjacent to a rotatable platen means for carrying an area to be illuminated by solar radiation, means for rotation of said platen about a horizontal axis relative to said enclosure from a first position to a second position, wherein in said first position said area is illuminated by solar radiation and said platen is on the equatorial side of said enclosure, and wherein in said second position said area is protected from the environment, and is substantially totally enclosed within said enclosure, and wherein the rotation of said platen from said first position to said second position requires a change in angle of more than ninety degrees wherein said enclosure has an aperture below said axis slightly larger than approximately half of said area, and wherein said enclosure has a rotatable covering, and wherein the rotation of said platen from said first position to said second position causes a portion of said platen to pass through said aperture, and also causes said rotatable covering to rotate in the same angular direction as the platen.

23. A solar energy receptor consisting of a tiltable platen supporting an area to be illuminated by solar radiation, said platen mounted rotatably on a horizontal shaft, end supports for said shaft consisting of two solid sides, said sides being rigidly positioned by the solid bottom of a box, said bottom being joined to each of the said two sides, said sides and said bottom forming an equator facing first aperture whose top is the said shaft, said solid bottom being shaped, to provide a rising wall opposite said first aperture, said wall terminating in an upper wall edge parallel to said shaft, each of said sides having an upper side edge, said upper side edges and said upper wall edge and said shaft forming a second aperture which is approximately a planar rectangle, wherein when said area to be illuminated is facing the sun, the upper portion of said area is defined as that which is above the shaft, and the lower portion of said area is defined as that which is below the shaft, one of said portions being small enough to rotate through one of said apertures, and for an additional elevation angle change of approximately 180 degrees of the said tiltable platen, the other of said portions being too large to rotate through said one of said apertures.

24. A protective enclosure for a tiltable platen supporting an area to be illuminated by solar radiation comprising an impervious surface providing a semiclosed section with an axis, a shaft parallel to said axis, closed ends perpendicular to said axis, said section being a closed surface for less than 180 degrees with respect to said axis, a first aperture bounded by said shaft, by one straight edge of said surface parallel to said shaft, and by radial edges of said ends, a second aperture bounded by said shaft, and by another straight edge of said surface parallel to said shaft, and by other radial edges of said ends, a hinged lid rotatable about said shaft through an angle of at least 30 degrees, said lid effectively enclosing said first aperture at both extreme positions of said angle, said platen rotatable about said shaft, said platen supporting a surface to be illuminated on one side, the other side being designated the platen back, means for rotating said platen to a first position so that said surface is outside of said apertures and capable of receiving solar energy from the direction opposite the said section, and said second aperture faces said platen back, and said lid is in a minimum-volume state when said platen is in said first position, said means also serving to rotate said platen to a second position whereby said second aperture is closed by said platen back on the outside, and said surface is enclosed by said section and said lid, said lid being in an expanded-volume state.

* * * * *